(12) United States Patent
Caluwaert

(10) Patent No.: US 11,611,553 B2
(45) Date of Patent: Mar. 21, 2023

(54) ONLINE IDENTITY VERIFICATION PLATFORM AND PROCESS

(71) Applicant: LAURIE CAL LLC, Fort Lauderdale, FL (US)

(72) Inventor: Laurie A. Caluwaert, Fort Lauderdale, FL (US)

(73) Assignee: LAURIE CAL LLC, Fort Lauderdale, FL (US)

( * ) Notice: Subject to any disclaimer, the term of this patent is extended or adjusted under 35 U.S.C. 154(b) by 0 days.

(21) Appl. No.: 16/891,534

(22) Filed: Jun. 3, 2020

(65) Prior Publication Data
US 2020/0296097 A1 Sep. 17, 2020

Related U.S. Application Data

(63) Continuation of application No. 16/423,544, filed on May 28, 2019, now Pat. No. 10,701,069, which is a continuation of application No. 16/156,186, filed on Oct. 10, 2018, now Pat. No. 10,348,726.

(60) Provisional application No. 62/570,439, filed on Oct. 10, 2017.

(51) Int. Cl.
| | | |
|---|---|---|
| *G06F 21/32* | (2013.01) | |
| *G06F 21/50* | (2013.01) | |
| *H04L 9/40* | (2022.01) | |
| *G06F 16/955* | (2019.01) | |
| *G06F 21/60* | (2013.01) | |

(52) U.S. Cl.
CPC ...... *H04L 63/0861* (2013.01); *G06F 16/9566* (2019.01); *G06F 21/32* (2013.01); *G06F 21/602* (2013.01)

(58) Field of Classification Search
CPC ...... G06F 21/31; G06F 21/32; G06F 16/9566; G06F 21/602; H04L 63/08; H04L 9/32; H04L 63/0861
USPC ........ 713/168, 176, 182, 186; 726/2, 27, 28, 726/29, 30
See application file for complete search history.

(56) References Cited

U.S. PATENT DOCUMENTS

| | | |
|---|---|---|
| 6,985,887 B1 | 1/2006 | Sunstein et al. |
| 7,127,614 B2 | 10/2006 | Kawaguchi et al. |
| 7,804,982 B2 | 9/2010 | Howard et al. |
| 8,024,578 B2 | 9/2011 | Geosimonian |
| 8,670,597 B2 | 3/2014 | Petrou et al. |

(Continued)

FOREIGN PATENT DOCUMENTS

JP 2002-91917 A 3/2002

OTHER PUBLICATIONS

Notification of Transmittal of the International Search Report and the Written Opinion of the International Searching Authority dated Jan. 7, 2019, in connection with corresponding international Application No. PCT/US2018/55168 (7 pgs.).

(Continued)

*Primary Examiner* — Izunna Okeke
(74) *Attorney, Agent, or Firm* — Maier & Maier, PLLC

(57) ABSTRACT

An online identity verification application may be provided. According to an exemplary embodiment, an online identity verification application may utilize photographic, biometric, and documentation identification protocols. The verification application may use a multi-tier verification process based on identification protocols to verify the owner of a verification account and subsequently verify any linked accounts.

18 Claims, 7 Drawing Sheets

(56) References Cited

U.S. PATENT DOCUMENTS

| | | | |
|---|---|---|---|
| 8,726,355 | B2 | 5/2014 | Shuster |
| 8,892,697 | B2 | 11/2014 | Nema |
| 8,902,045 | B1 | 12/2014 | Linn et al. |
| 8,949,954 | B2 | 2/2015 | Etchegoyen |
| 8,994,499 | B2 | 3/2015 | Zhao et al. |
| 9,202,099 | B2 | 12/2015 | Han et al. |
| 9,495,586 | B1 | 11/2016 | Hagen et al. |
| 9,619,694 | B2 | 4/2017 | Garcia et al. |
| 2004/0123131 | A1 | 6/2004 | Zacks et al. |
| 2007/0219926 | A1 | 9/2007 | Korn |
| 2009/0021349 | A1 | 1/2009 | Errico et al. |
| 2009/0034862 | A1* | 2/2009 | Brown .................. H04N 21/84 382/260 |
| 2009/0187764 | A1 | 7/2009 | Astakhov et al. |
| 2009/0224889 | A1 | 9/2009 | Aggarwal et al. |
| 2011/0051998 | A1 | 3/2011 | Rhoads |
| 2011/0204142 | A1 | 8/2011 | Rao |
| 2012/0151569 | A1* | 6/2012 | Farsedakis .......... H04L 63/0869 726/8 |
| 2013/0117832 | A1 | 5/2013 | Gandhi et al. |
| 2014/0196143 | A1 | 7/2014 | Fliderman et al. |
| 2015/0128222 | A1 | 5/2015 | Festa et al. |
| 2015/0339788 | A1 | 11/2015 | Dawson |
| 2017/0076291 | A1 | 3/2017 | Cairns et al. |
| 2017/0134366 | A1 | 5/2017 | Genner |

OTHER PUBLICATIONS

British Examination Report dated Nov. 5, 2021, in connection with corresponding international Application No. GB2005786.5 (6 pages).

Examination Report dated Mar. 11, 2022 in Great Britain Application No. GB2005786.5; 3 pages.

* cited by examiner

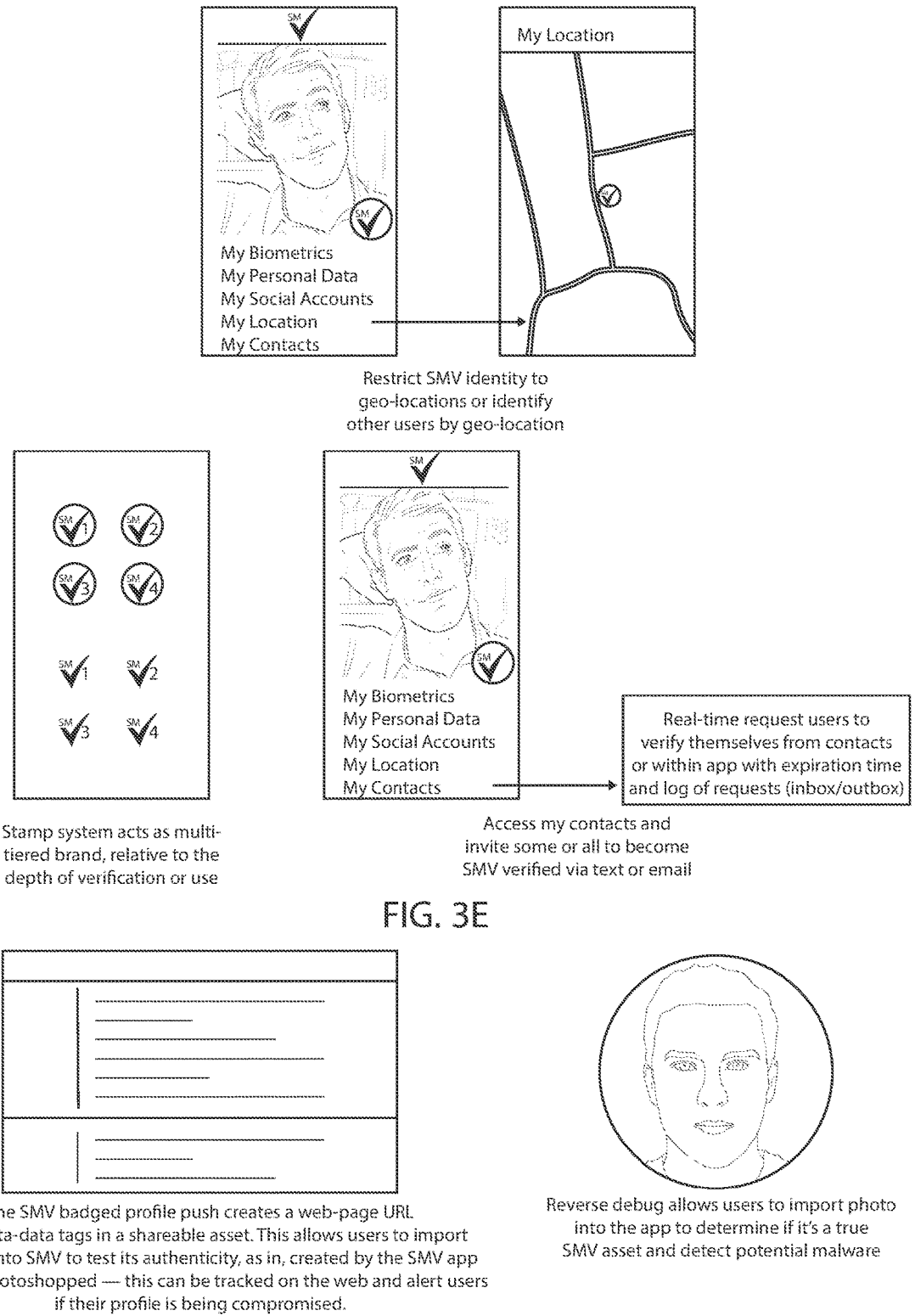

Restrict SMV identity to geo-locations or identify other users by geo-location

Stamp system acts as multi-tiered brand, relative to the depth of verification or use Access my contacts and invite some or all to become SMV verified via text or email Real-time request users to verify themselves from contacts or within app with expiration time and log of requests (inbox/outbox)

FIG. 3E

The SMV badged profile push creates a web-page URL with meta-data tags in a shareable asset. This allows users to import an asset into SMV to test its authenticity, as in, created by the SMV app and not photoshopped — this can be tracked on the web and alert users if their profile is being compromised.

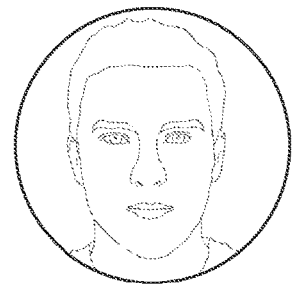

Reverse debug allows users to import photo into the app to determine if it's a true SMV asset and detect potential malware

FIG. 3F

ONLINE IDENTITY VERIFICATION PLATFORM AND PROCESS

CROSS-REFERENCE TO RELATED APPLICATIONS

This application is a continuation of U.S. patent application Ser. No. 16/423,544, filed May 28, 2019, which claims priority as a continuation of U.S. patent application Ser. No. 16/156,186, filed Oct. 10, 2018, now U.S. Pat. No. 10,348,726, issued Jul. 9, 2019, which claims priority to United States Provisional Patent Application No. 62/570,439, filed Oct. 10, 2017, the entire disclosures of which are hereby incorporated by reference in their entireties.

BACKGROUND

The expansive and accessible growth of online and mobile computing systems has created a complex network where users interact with one another based on the assumed credibility of a user-defined personal profile. The ability for users to create personal profiles without regulation has enabled the creation of fake identities. Online users create fake identities that enable them to betray unsuspecting individuals into providing personal attention or information. Without a means to verify the identity of the person with whom they are interacting, the unsuspecting users fall victim to shame and personal harm from the creators of the fraudulent profiles. The fraudulent profile creators deliver harm in many forms, including (but not limited to), catfishing, cyber-bullying, sex trafficking, monetary or identify theft and other general crimes, violent or otherwise, in domestic, public or commercial settings. The deviant behavior is carried out after having influenced the victims to trust the credibility of a fraudulent profile and that the implied or communicated intentions of the fraudulent account creator were legitimate and pure, as relates to the content and presentation of the data contained within their fake personal profile. It may therefore be desired to implement a system or process for verifying the identity of online profile creators and users.

The rise of online interactions allows users to assume identities and communicate using those assumed identities. The inherent anonymity of the internet allows these users to sometimes use the likeness of others when creating their online identity or sometimes even assume the identity of unsuspecting individuals. The threats created range from personal privacy, theft, and even physical harm.

Children may be vulnerable to users pretending to be peers. Stalkers and dating site predators may assume false identities. Fake accounts assuming someone's identity may be used to spread private or false information in order to damage a person's reputation, mislead others, or bully an individual. Personal, private information may be shared without permission. Identity theft, cyber-bullying and countless other malicious actions are facilitated by the internet.

It therefore may be desirable to have a platform for verifying the identity of online accountholders.

SUMMARY

An online identity verification application may be provided. According to an exemplary embodiment, an online identity verification application may utilize photographic, biometric, and documentation identification protocols. The verification application may use a multi-tier verification process based on identification protocols to verify the owner of a verification account and subsequently verify any linked accounts.

BRIEF DESCRIPTION OF THE FIGURES

Advantages of embodiments of the present invention will be apparent from the following detailed description of the exemplary embodiments. The following detailed description should be considered in conjunction with the accompanying figures in which:

Exemplary

Exemplary

Exemplary

Exemplary

Exemplary

Exemplary

Exemplary FIG. 3E shows a graphical user interface of an identity verification application;

Exemplary FIG. 3F shows a graphical user interface of an identity verification application;

Exemplary

DETAILED DESCRIPTION

Figure 1:
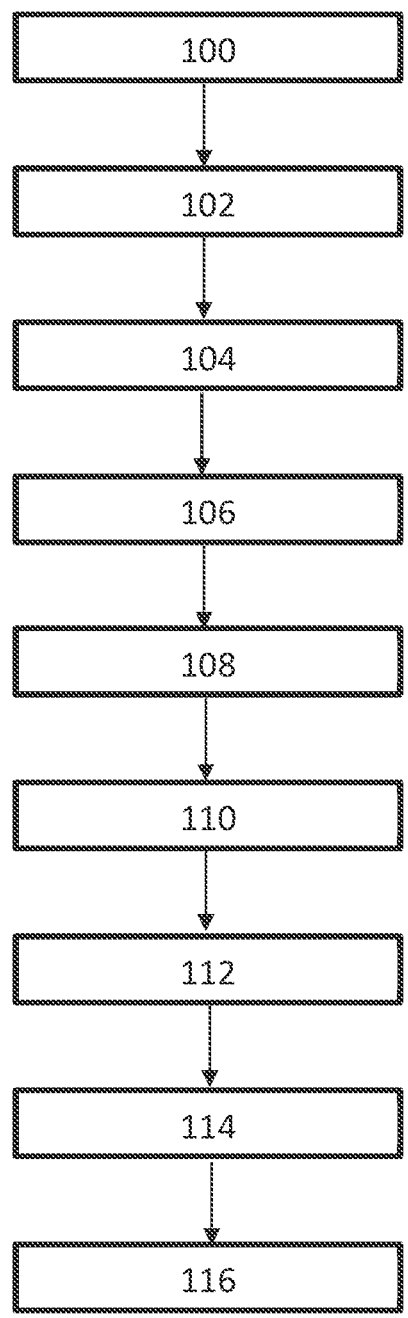
FIG. 1 shows an online identity verification process flowchart.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to at least one exemplary embodiment, an online identity verification application may be provided. The application may be implemented to prevent others from hijacking an online identity. The application may use a multi-tier verification process to ensure and identify valid accounts. The application may be a downloadable application, mobile application, or web-based application that may allow a user to establish a unique online identity by registering personal data assets and linking those assets to a badge of authenticity. Exemplary data assets may include birthdate, email address, phone number, location, social security number, tax ID number, driver's license number, passport number, computing device ID, student or faculty identifier, work identifier or military identifier, commercial identifiers, banking identifiers, business identifiers, federal identifiers, state identifiers, account numbers, barcode or RFID scans or chip encrypted data among other possible data assets as would be understood by a person having ordinary skill in the art. Data assets may also include biometric data, such as facial recognition scans, retina scans, fingerprints or thumbprints, veins, palm prints, hand geometry, iris recognition, odor or scent, DNA, voice recordings, and/or health statistics such as heartrate, biorhythmic data, stride and gait data. The application may allow the creation, storage, and linking of the personal data assets. The badge of authenticity may include a visual badge, which may be incorporated in an encrypted photograph. A user may batch push or post the encrypted photo and/or badge onto a user device or web-based media location for the purpose of both displaying the registered badge and allowing $3^{rd}$ party users to reverse or import a photo asset back into the application to verify the photo/badge asset as authenticated in the application. Furthermore, the application may require protected sign-on or identity verification during each use.

Now referring to the Figures generally, a platform for verifying an online identity may be provided. The platform may utilize a software application installed on a device. The device may be a mobile device, personal computer, or tablet. According to exemplary embodiments, the device may have a camera, a GPS transceiver, microphone, gyroscope, and/or a finger print scanner. The device may further include at least one biometric monitoring accessory capable of measuring or scanning biometric data of a user. In some embodiments, the platform be a downloadable application and may operate across various operating systems and computing environments. For example, these environments may include iOS, Android, and personal/enterprise computing systems, including PC or Mac desktops and laptops. In other embodiments, the platform may operate in a purely or partially web-based environment. The application may store user data on the device's local memory and/or in a cloud or enterprise-based storage system. User data may include data entered by the user through a graphical user interface or data collected using device hardware, such as the device camera, microphone, GPS transceiver, gyroscope, or a scanner, such as a fingerprint scanner.

Referring to exemplary FIG. 1, a process for verifying an identity may be provided. The identity verification application may be accessed through a downloadable application or a web-based interface. First, a user may create an account with the identity verification application 100. The device enabled application may require a user to create a user account by establishing personal bibliographic data. According to some exemplary embodiments, the application may further require contact information for sign-up, including an e-mail address and/or telephone number. Upon sign-up, the application may require a code provided via e-mail or text message in order to confirm that the user is in-fact the owner of the e-mail and/or telephone number. The application may also require a user to provide user-specific biometric and/or restricted GPS-based location entries upon sign-up, which may be stored for future verification of the user as unique to the stored attributes.

The user may enter desired bibliographic information, such as name, age, birthday, address, contact information, and other information used by online accounts, such as social media, dating, gaming, and shopping applications and websites, as would be understood by a person having ordinary skill in the art. The bibliographic information may include required and optional elements.

Once a user has established an authenticated account using the application, a user may utilize the application to create a profile picture 102. A specific process for creating a profile picture may be shown in the exemplary flow chart of FIG. 2. The profile picture may be a standard photograph or selfie photograph 102. The picture upload through the application may require that the photo be taken in real time to ensure the user is present when creating the account. The picture may be uploaded through a phone camera, webcam, or other camera as would be understood by a person having ordinary skill in the art. Once taken or uploaded, a user may be able to accept, retake or cancel the picture. Additionally, the application may enable the creation of a unique steganographic log of the profile picture within an application database. If the profile picture is changed or retaken, a new steganographic log may be created, but all steganographic logs for profile pictures may be tied to a user's unique identity account. This data may be linked by way of the profile from which the data was created. It may further be possible for a user to verify multiple images for verified sharing across media platforms. In some embodiments, the picture may be a 180 degree panoramic picture or a video of the user to be used as an original or profile picture with steganographic encryption tied to the user profile. The bibliographic and photographic data may be stored in a verification application database.

A visual stamp of authentication may optionally be applied to the profile picture and in some embodiments, a cyber-identification number linked to a user's profile data elements may be stored in the profile picture data. For example, the cyber-identification number may be embedded within the stamp and may be displayed or enabled if a user clicks, hard presses, or otherwise interacts with the stamp. The stamp or badge may be presented using different tiers, which may be represented by color, size or location based on the depth, level or application of the user's profile setup. This may allow for the differentiation of levels of authenticity or arena of use. Furthermore, a user may restrict verified use of their profile to certain GPS-based geographical locations.

Additionally, a user may be required to upload certain biometric data 104. The biometric data may include a palm print, face, fingerprints, hand geometry, handwriting, iris, retinal, vein, and voice data and other data assets, as detailed above. The biometric data may be captured through a combination of scanners, cameras, and tactile screens implemented as peripherals or integrated in mobile phones, tablets, or personal computers. According to an exemplary embodiment, at least two biometric data assets may be required in addition to a photograph. In some exemplary embodiments, recording the biometric data may be required to be real time to ensure the account creator is present. The biometric data may be uploaded and saved in the verification application database. The steps for providing information, including biometric data and picture, for creating a user account may be required any order and may be include ongoing requirements. In some exemplary embodiments, the creation of the profile picture may be the last step of account creation.

In some embodiments, a user may upload a scan or image of an identification document 106. This document may optionally be required to be government issued, such as a driver's license or passport, as would be understood by a person having ordinary skill in the art. In some further exemplary embodiments, a user may upload a scan or image of a bill showing identifying information of the account creator 108. The bill may optionally be required to fall within a certain date range to show that the data is current. The application may utilize optical character recognition (OCR) capabilities to read information on the identification documents and/or the bill. This information may be uploaded to the verification database and may be compared with other data entered by the account creator.

The verification application may optionally compare the profile picture with an image on the uploaded identification document using facial recognition capabilities to ensure the creator of the account matches the holder of the identification. In some embodiments, each piece of information may be required to verify an account.

Once the verification data has been uploaded to a verification database, the information may be compared to ensure the data matches 110. This may verify the identification verification account creator's identity. Once the identity verification application account is verified, the user may link their new and existing online accounts, such as social media accounts, to their identity verification application account 112. In some further exemplary embodiments, a user may be able to use their identity verification application account to create accounts and log-in to third party platforms. The verification application may be capable of tagging a user's data profile or desired data assets, including a profile picture, with a unique cyber-identification number or global unique identifier, which may tie the data assets into a single profile.

The identity verification application may compare the identity data associated with a particular user with the data stored and/or shared through any linked accounts 114. Where the information is consistent and identifies the owner of the identity verification account, the linked accounts may be verified. According to some exemplary embodiments, a form of verification indicia, such as a verified icon or stamp, may be displayed through linked accounts to show that they have been verified by the identity verification application 116. This may allow third parties interacting with one of the linked accounts to see that the identity of its creator has been verified.

Owners of verified accounts may optionally choose to engage only with other verified accounts. It therefore may be possible to send verification requests to all unverified contacts found in the linked accounts. Furthermore, the identity verification application may optionally remove any unverified contacts or may only accept new contacts that are verified. When an unverified contact interacts with a verified linked account of the verification application user, the verification application may send a request for that unverified contact to verify their accounts using the identity verification application.

In some further exemplary embodiments, the identity verification application may detect attempts to create verification accounts with duplicate information and may alert a user of such instances. The encrypted profile picture and/or badge may also incorporate tracking capability to identify all uses of the picture. Any unauthorized uses may therefore be detected. The identity verification application may suspend verification of attempted duplicate accounts until resolved.

If during the verification process, a discrepancy is detected among the identification data collected and analyzed, a verification account may be suspended. Furthermore, if a verification account is reported as being suspicious or false, the account may be suspended pending further review protocols and/or third-party interaction. Suspended accounts may remove verification stamps from associated or linked accounts. In yet further exemplary embodiments, flagged accounts may present a warning stamp on linked accounts.

Other features of the verification application may include the ability to access phone contact directory data and to send requests by text, mobile application, email or social media request for contacts to verify their identity through the identity verification application. Furthermore, the application may allow a user to set a time limitation within which contacts must verify their identity. Incoming and outgoing verification requests may be tracked in an inbox and outbox accessible through the application and exemplary statuses may include requested, pending, successfully completed or expired. In some embodiments, a timed reminder request may be sent to contacts when they are nearing the expiration of a request without having successfully verified their identity through the verification application. In some embodiments, user sign-up and or later verification may be performed through proprietary or third-party identification kiosks, such as airport security kiosks and other kiosks as would be understood by a person having ordinary skill in the art. The application may share information or otherwise interact with kiosks, for example, by sharing stored user information among databases or by transferring or receiving user data collected through kiosk hardware.

The application may be capable of pushing the badge and cyber identification number or steganographic encrypted code to a user's device storage, website or social media profile as a badge of authentication that may be applied to a user profile. This may also include the ability to do a batched push to a number of digital landing points via a "select some" or "select all" option prior to executing the export. The application may further be capable of pushing the steganographic encoded picture with the badge, either accompanied or not accompanied by the cyber identification number, to a user's device storage, website or social media profile as a badge of authentication that can be applied to a user profile, as detailed above. The application may also create a Uniform Resource Locator (URL), which may link to a database storing encrypted badge and profile picture details in addition to desired user data, such as location, time and date stamp, and a device from which the picture was exported. The URL may be used for future matching of the profile picture and profile data. The application may allow direct integration with open architecture or cooperative social and web or device-based media to seamlessly post cyber-encrypted badges, profile pictures which may have stenographic encryption and URL assets.

The application may further include features for verification requests and real-time verification during interactions with other users. For example, a real-time selfie, 180 degree panoramic photograph or video may be sent from within the application upon a request from another application user. Furthermore, the application may be capable of facilitating real-time video chats, audio chats, or other interactions from within the application. These interactions may be scheduled, initiated, or upon request. A user or third party may also be able to import an image or video asset through an application interface, whereby the application may advise if the asset is a verified asset. The application may assess the asset by comparing the asset's steganography, cyber-identification number, URL data, and/or other meta data against the data stored within an application user database.

As detailed above, a user may be alerted if their encrypted data, such as the steganographic code, cyber-identification number or URL data, is used in digital media. The application may allow a user to send an emergency alert to other users if their online identity has been compromised. In yet further exemplary embodiments, the application may perform a background check on a user, based on data provided in the user profile, through reverse lookup or blockchain technology capabilities in third party web databases.

The application may be capable of integrating and processing payment data from a third party payment collection, storage and processing system in order to collect revenue and issue credits from usage of the application. A user may further be able to pin their location using the application and device GPS hardware and may be able to request that other users pin a location while using the application, in order to verify that users are in the same or different locations on a real-time basis. The application may also include a search interface for searching other users' profiles. The application may allow a user to set custom privacy settings, allowing a user's profile or elements of a user's profile to be set as restricted or visible to the public. The application may also allow a user to search the internet for matches between a web-based user photo or profile and a verified user profile. The comparison may link the encrypted data to return a positive or negative match. In addition, the application may process usage analytics in order to track usage of the application and features for future product and service enhancements. Furthermore, the application may include an interface for uploading or importing an image file, which the application may read or scan to identify the presence of malware embedded within the file metadata. In some exemplary embodiments, the original user profile picture created when setting up an account may be permanently displayed or otherwise linked to the account. This may prevent a user from changing their account information to reflect a different individual. Also, the user data for an individual may be utilized to prevent that individual from creating multiple user accounts or otherwise attempting to create a misleading profile.

Figure 2:
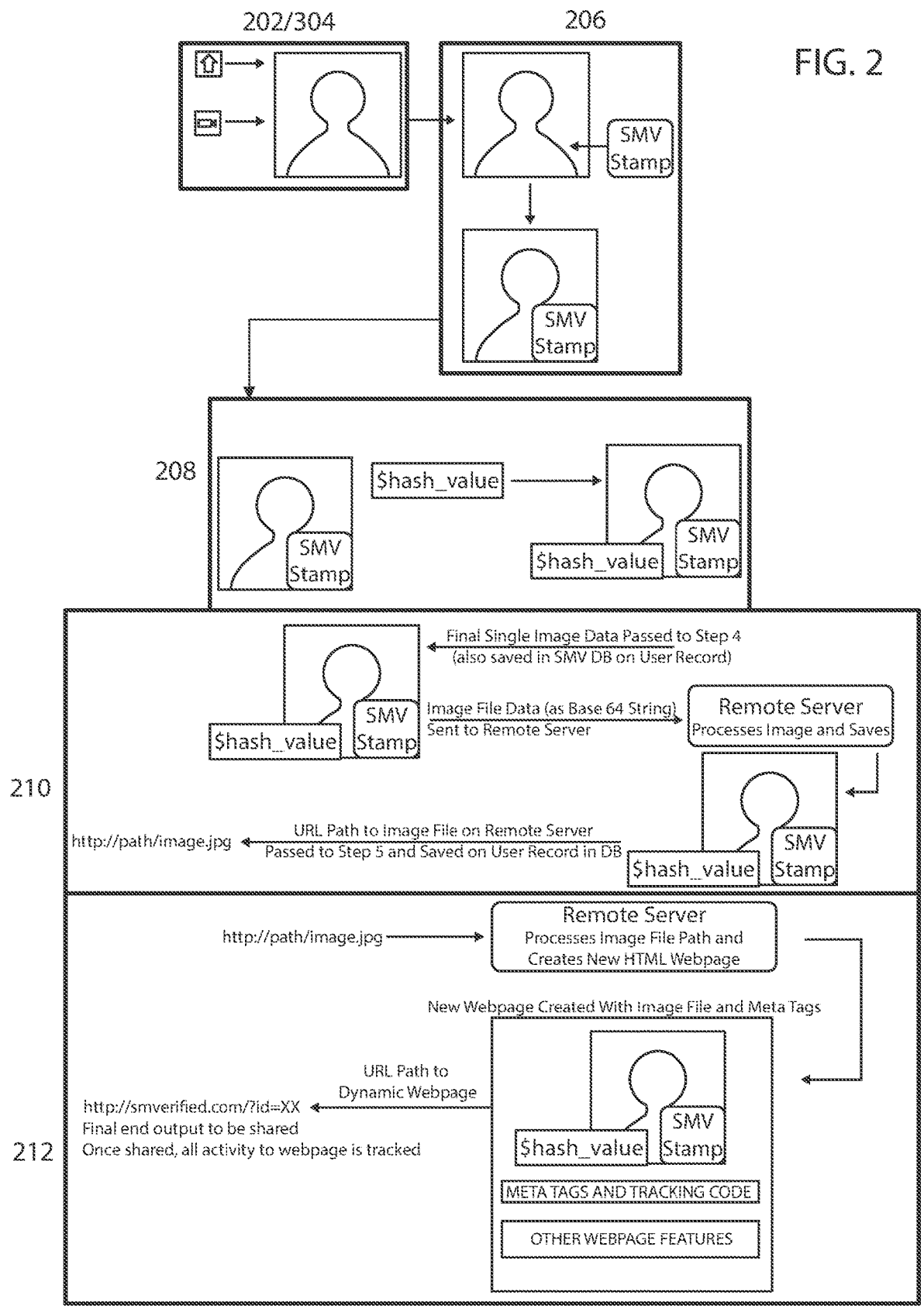
FIG. 2 shows a flow chart for creating a profile picture.
Figure 3A:
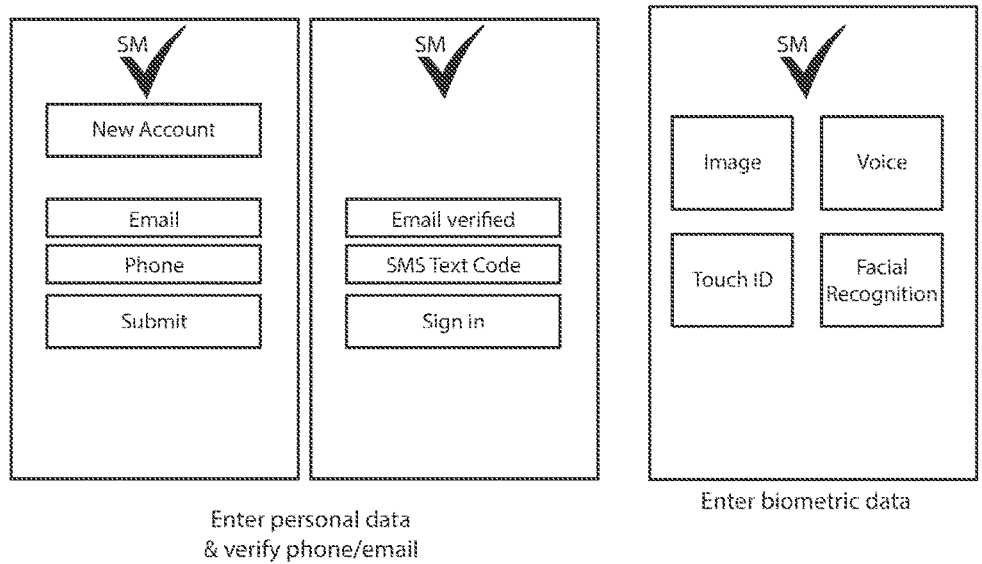
FIG. 3A shows a graphical user interface of an identity verification application.
Figure 3B:
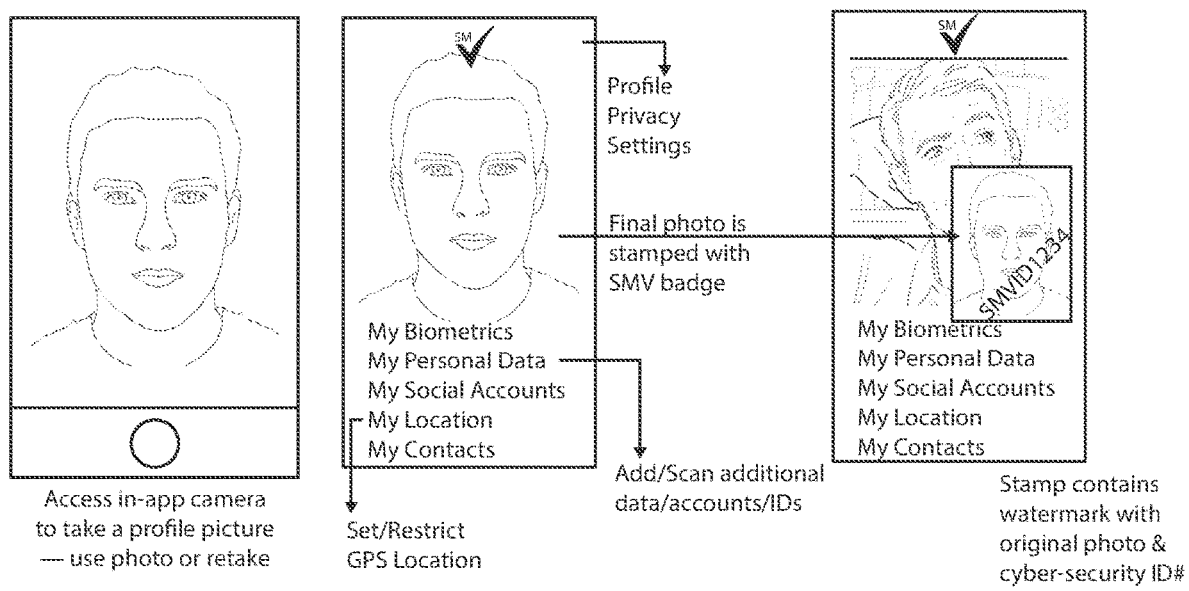
FIG. 3B shows a graphical user interface of an identity verification application.
Figure 3C:
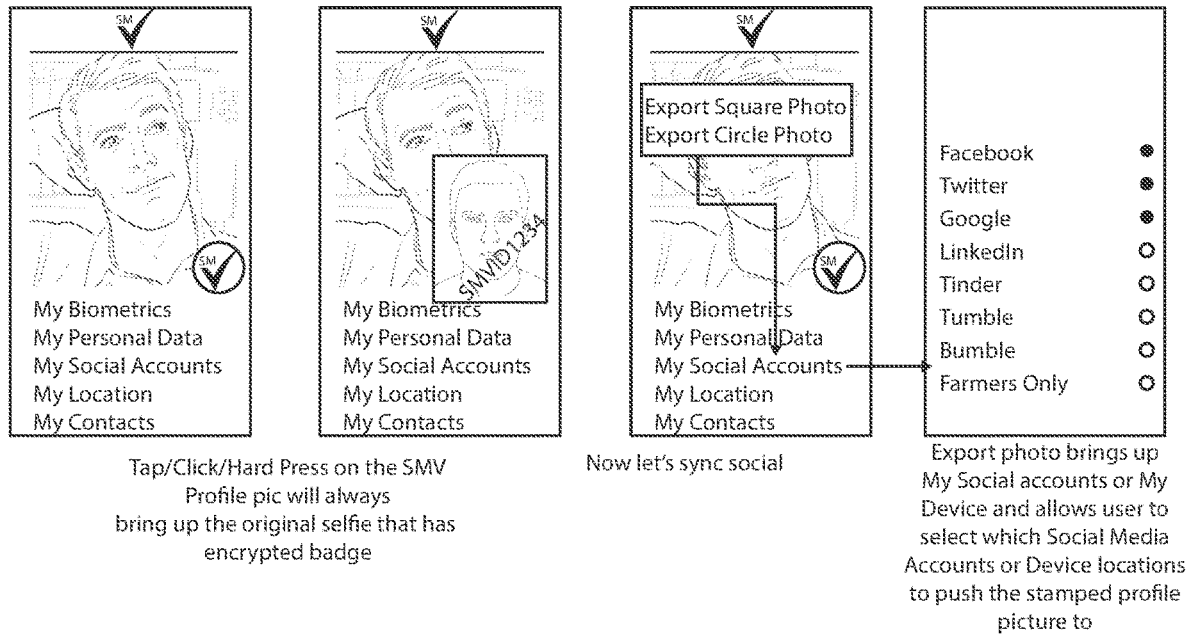
FIG. 3C shows a graphical user interface of an identity verification application.
Figure 3D:
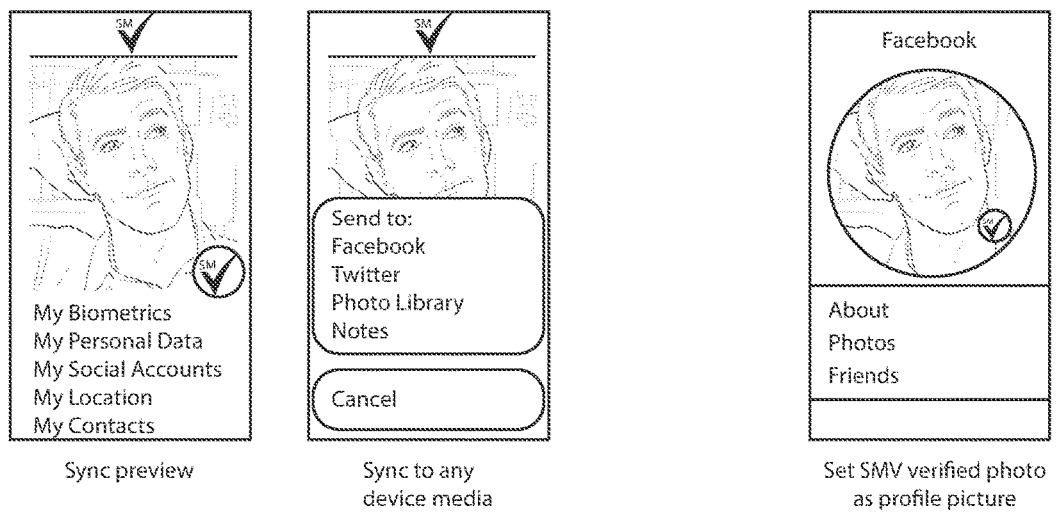
FIG. 3D shows a graphical user interface of an identity verification application.

Now referring to exemplary FIG. 2, the profile picture may be created by engaging the application and triggering the application to activate a device camera. The device camera may then be used to capture a photo, which may be rendered in the application and uploaded or stored as user data, and which may be accessed by the application 202. In other embodiments, an existing photo file may be uploaded using the application 204. The profile picture image file may optionally be, for example, a .jpg, .png, or .gif file.

Once a profile picture has been uploaded and is accessible by the application, the profile picture image file may be automatically edited by the application program to embed a visual badge of authenticity in the picture file, which may be visible to users when the picture is displayed 206. The profile picture image file may be rendered on a screen using the application. The application may render the stamp, badge or branding visual element on top of the image file, such that the images are layered. The application may then combine the layered images into a single new stamped image file.

The new stamped image file may be automatically edited by the application program to embed steganographic code or a digital watermark within the picture that may be linked to the user-specific data, or personal data stored within the device and user specific data database 208. Data described herein may be embedded in the stamp, picture, or combined stamped picture, as would be understood by a person having ordinary skill in the art. The profile picture may be encrypted with the steganographic code in a manner capable of preventing tampering and/or editing. The combined image file may then be rendered on the screen using the application, and an Export feature of the application may be utilized to generate an encoded image for verifying a user's identity. The application may generate an encrypted string of text, which may contain a global unique identifier (GUID) for the user and/or an export timestamp. The export timestamp may be recorded in milliseconds or other timeframes as desired. Using steganography, the application may encode the encrypted string into the stamped image file. In some alternative embodiments, other known methods of digital watermarking or encoding may be used, as would be understood by a person having ordinary skill in the art. The unique string may be encoded into an Alpha Layer of the image file. An Alpha Layer may be an opacity layer in an image file. During the encoding process, the application may conduct a reverse check for any previously encoded data, such as malware. A final image file, which may be watermarked and encoded, may result. The final image file may, for example, be in the form of a Base 64 Encoded String, or other forms as would be understood by a person having ordinary skill in the art.

The final image asset may be output, as shown in step 210. The image file data of the final image may be used to render the final image on a device screen using the application. The image file data of the final image may also be uploaded to a cloud database in order to re-render the final image at any point. The image file data of the final image may also be sent via a secure call to a remote server, such as a secure Web Service RESTful API call to a remote server. The remote server may process the image file data of the final image and create and save a web accessible image file on the remote server. A URL path to the image file on the remote server may be created and saved as user-specific data in the user record database. A user may optionally save the image file to a local device or may share the URL path.

Next, a dynamic webpage and URL may be created 212. Using the URL path to the image file as a payload, a secure Web Service RESTful API call may be sent to the remote server. The remote server may process the Image URL path and create a new dynamic webpage which may be rendered as a new HTML page. The new HTML page may include the rendered image file, as well as coding used to track analytics. The coding may include HTML/CSS/JavaScript. The new HTML page may also include Open Graph (OG) and other meta tags to identify all meta data and prepare the webpage to be shared. The application may return the webpage's URL path to a user and may save the URL path as a user-specific record in the user record database. The URL path to the webpage may then be shared as a URL, which may dynamically pull in the image file. The dynamic webpage may further include real time tracking of activity and other features, such as biometric assets, video, or a pre-set webpage expiration. The webpage URL or final image file, encoded with the webpage URL link may be used to verify an online identity. The URL link may be encoded in the photograph portion, stamp portion, and/or the entire combined final image file, as desired.

Once a user has established an account, recorded user-specific data, and created an encrypted photograph and/or badge of authenticity, the user may utilize the application to verify identity on a range of platforms. The application may be used to push the encrypted or badged photograph to any device-enabled features, such as the camera gallery, text messages, emails, mobile applications, or social media sites. The authenticated photograph or badge of authenticity may be used to create personal profiles across web-based applications or may be stored in a user account for use as an identification measure in areas of commerce, education, military, or workplace settings. In some embodiments, the application may store the encrypted and badged photograph for future recall within an application-based gallery.

In an additional step, the identity verification application may utilize API integration with third party social media sites or social networks, including virtual and mixed reality platforms. Using a secure API, which may be directly established between the identity verification application and third party networks, a call may be made form the application to the respective network with a payload including a user's GUID and an export timestamp, which may be in milliseconds or other timeframe as desired. The call may be made every time a photo link is generated and may also be made on the initial time that a user establishes any authentication between the application and the respective network. The encrypted payload of the request may send the network valid authenticated user ID info, which may include the user's cyber ID that ties the application account to all other networks. Finally, the respective third party network may receive the call and consume the payload. Upon validation of the user existing in the third party network, the third party network may dispatch application layer code to change the user interface of their social network application to display a badge icon or copy on the user profile page of the respective third party network.

Exemplary graphical user interfaces for performing the steps described herein utilizing the identity verification application may be seem in FIGS. 3A-3F.

Figure 4:
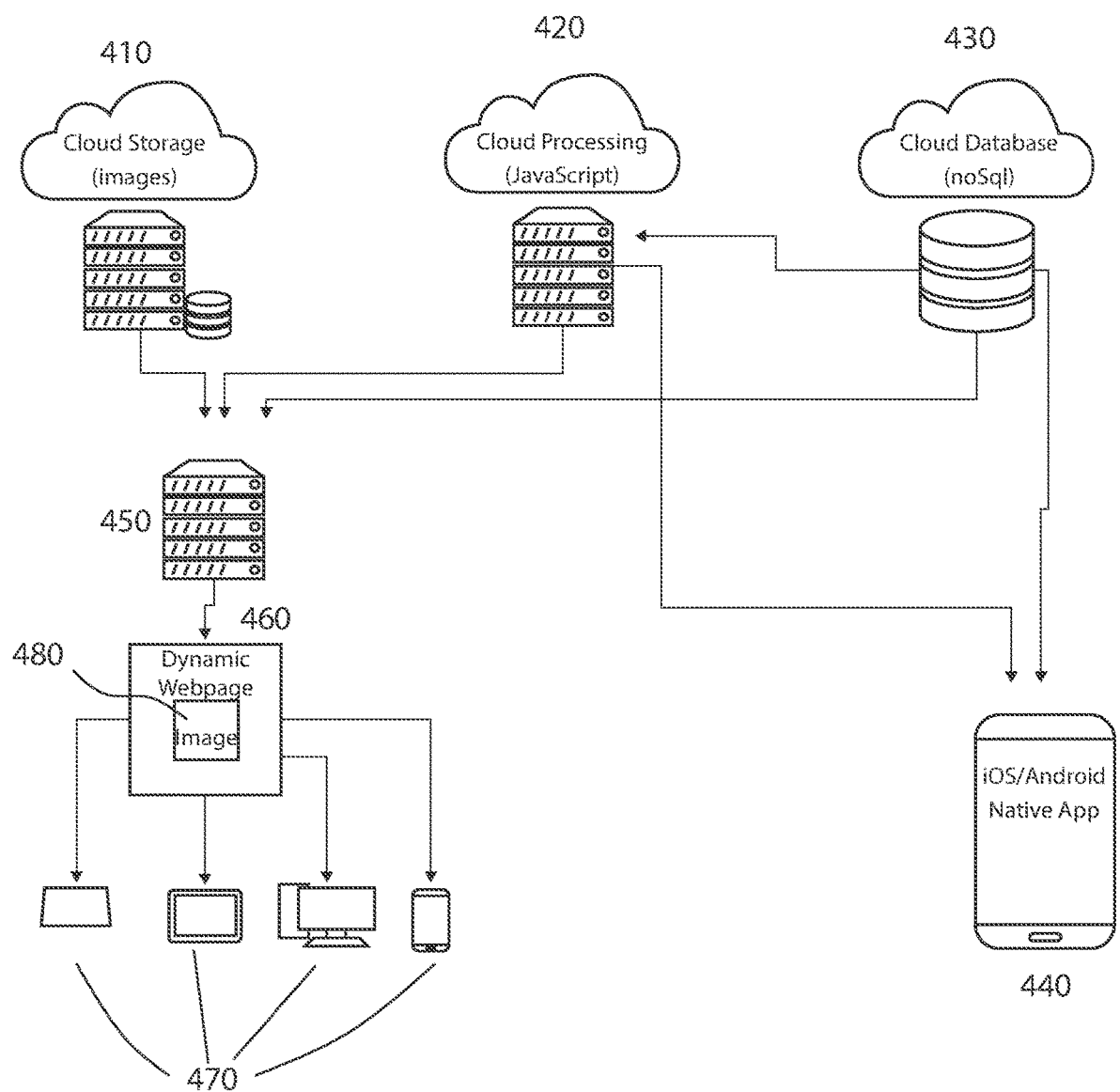
FIG. 4 shows a technology architecture for the identity verification platform; and Exemplary

Now referring to exemplary FIG. 4, a technology architecture may be provided through which the verification application may operate. All verified images, including images taken through the application or publicly exported images, may be stored in a real-time cloud image store 410. The images may be stored as image files and also as encoded strings. Image file formats may include .jpg or .png and encoded strings may be base64 encoded strings. Processing for authentication, including third party social integrations, and methods for putting data in and out of the cloud database may be performed in a cloud processing layer 420. The cloud processing layer may utilize JavaScript. In certain embodiments, the native application may call functions and pass data, but all processing may occur in the cloud processing layer 420. In some alternatively embodiments, processing may be performed in a combination of the cloud and a device processor or exclusively on a device processor. All user data may be stored in a real-time cloud datastore 430. The datastore may optionally be a noSQL style real-time cloud datastore. The native application, which may be an iOS or Android application, may communicate with the cloud data and cloud processing layers 410, 420, 430 in order to pass inputs and outputs for user authentication and access or update user record data from the cloud database. According to an exemplary embodiment, processing for biometric inputs may occur locally on a user device 440. The native application may use features on a user device, such as a camera, touch sensors and scanners, facial recognition, and microphone, to collect inputs that may include photos, voice, or touch biometrics. Furthermore, the device geolocation features may be used to collect a user location. Other data may be collected as referenced with regard to embodiments disclosed herein. Once data has been collected, it may be sent to the cloud layers for storage.

Using inputs from the cloud layers, a web server 450 may process and create a user's dynamic URL endpoint 460, which may be expressed as a webpage viewable by web connected devices. The page may be viewable through a browser. End users may subsequently view verified photos using any web connected device 470. The page and/or verified photos may optionally be viewed through a browser for through the authentication application. When a user exports a verified photo, it may create a web accessible link, which may display the photo or image 480. The link displayed as an image may also be shared among devices or on social media platforms.

In some further embodiments, users may request video from other users in order to verify identity. The video requests may be fulfilled by live video or recorded clips. During recorded video clips a user may, for example, respond to particular questions or queues from a requester.

As indicated above, the verification application may be utilized to verify identity in virtual or mixed reality environments. In such environments, a badge or other indicator of a verified identity exhibiting the functionality disclosed herein may be utilized, as would be understood by a person having ordinary skill in the art.

Interactions with a verified account may be detailed according to the following exemplary embodiment. In this exemplary embodiment, the badge may have an encrypted watermark, as detailed above, which may facilitate identity verification through the application. When, for example, the badge of the picture is engaged, the account holder's cyber identification number may appear with a link to the account holder's application profile page. The badge, picture, or combination of the badge and picture may reveal the ID and link when engaged. In some embodiments, the picture may need to be engaged first before engaging the badge. When the link or ID is selected, the user may be directed to the account holder's identity verification application page, if the account holder has registered and created a valid account. The account holder page may display the application profile picture created with the identity verification application account. The application profile picture may be displayed regardless of the picture engaged on the third party or social media site.

The account holder may access a photo library or take photos through the application, in addition to the application account profile picture, and the application may be embed these photos with the verified badge. This may prevent third parties from stealing or otherwise using these photos, such as to create fake accounts. There may be a feature for pushing these verified or stamped photos to third party accounts, such as a social media profile. For example, the application may include an option for selecting third party accounts to which the stamped pictures should be uploaded. These stamped images may then be engaged to direct a visitor to the account holder's application account page, displaying the account profile picture and verification information. Lastly, the identity verification application may provide for users to enter a name or ID number to search a database of verified account holders. In some embodiments, the verified page may also direct users to the account holder's verified online pages and profiles.

Figure 5:
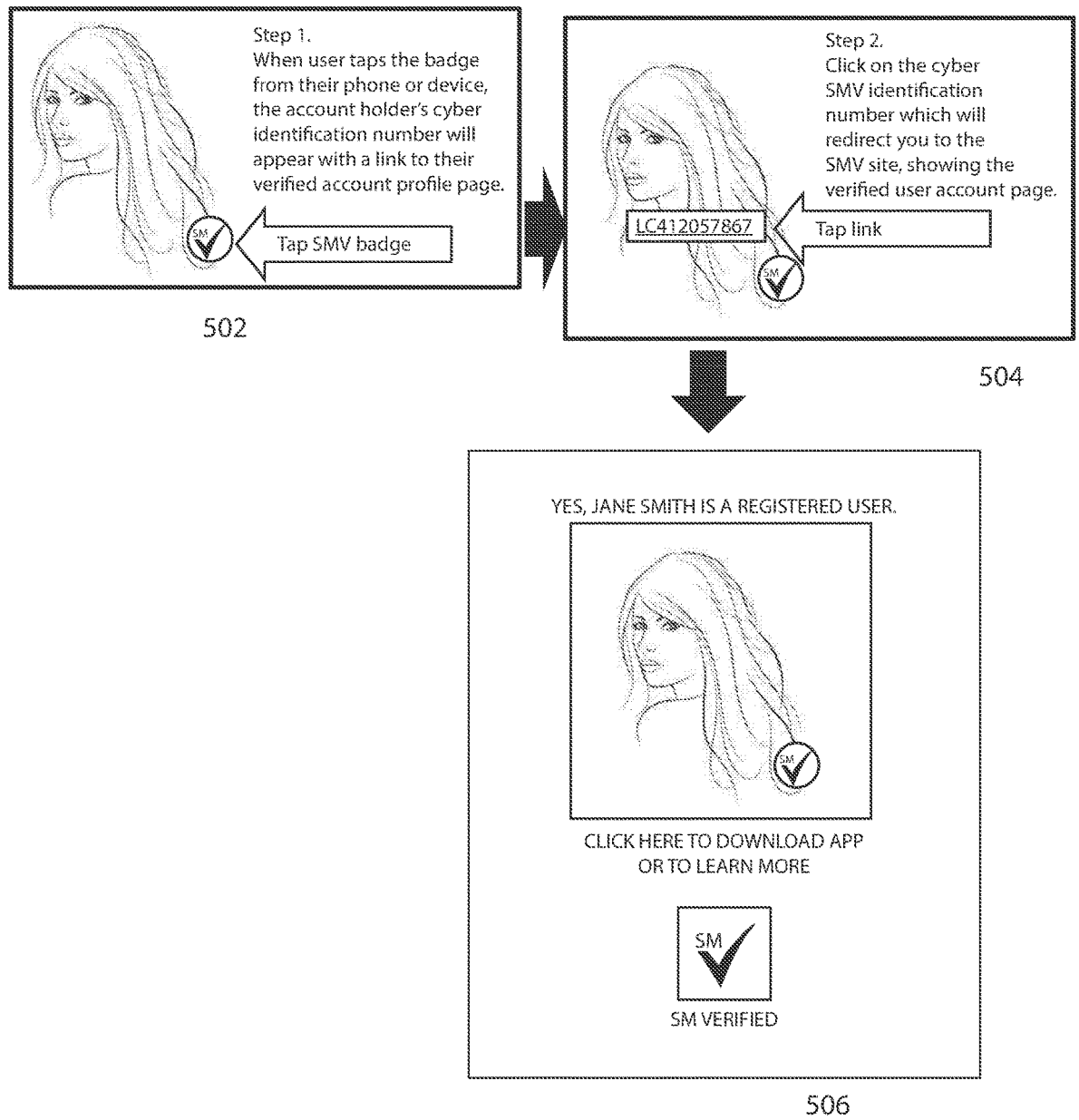
FIG. 5 shows a graphical user interface of an identity verification application.

According to at least one exemplary embodiment, verification may be a one time qualification process. Once approved, the verification status may remain with the account holder as long as the account exists and unless the account is flagged. There may be limits on the number of times a user may edit or change certain bibliographic or identifying data, such as a name change. The verification stamp may have a hyperlink with the user's cyber identification number or GUID, which may be registered to that user and only that user. In some embodiments, a user may only be granted one cyber ID or GUID. This may be controlled through the matching of biometric data or other verification steps provided herein, such as through e-mail, text-message, or kiosk verification. As demonstrated in FIG. 5, when a third party taps or presses a verification stamp on a profile 502, it may display the GUID and/or a hyperlink 504, which may direct the third party to the user account profile page 506. The account profile page may show the picture of the user that was created during the account creation/registration process. Therefore, while a user may be able to change certain identification data, such as a name, the original profile picture, which may be the encrypted version, may not be changed. In some alternative embodiments, all original registration information may be retained and accessible, despite current information being updated. In some embodiments, the GUID displayed when a third party selects or engages the verification stamp may contain the hyperlink.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for online identity verification of a user comprising:
   layering a stamp on a photograph of the user to create a new image file, wherein
   the stamp is a visual badge of authenticity;
   generating a unique identifier for the user;
   editing the new image file to embed steganographic code or a digital water mark to encode the new image file with an encrypted text string resulting in an encrypted profile picture, wherein the encrypted text string comprises the unique identifier;
   encoding the stamp with the unique identifier and a dynamic webpage URL, such that the stamp is configured to display the unique identifier and a link to the dynamic webpage URL when selected or engaged through a GUI; and
   exporting the encrypted profile picture to the dynamic webpage,
   wherein an export timestamp is generated and incorporated in the encrypted text string during export, and
   creating an alert when the unique identifier or dynamic webpage URL is used in digital media,
   wherein the encrypted profile picture created is permanently displayed on the dynamic webpage, and
   wherein the stamp appearance varies with the amount of user data collected for verification.

2. The method of claim 1, wherein the dynamic webpage is accessible to a party seeking to verify an online identity of the user.

3. The method of claim 1, wherein the encrypted text string further comprises an export timestamp.

4. The method of claim 1, wherein the dynamic webpage is a user account profile page.

5. The method of claim 1, further comprising storing or communicating user data with a user database and sending a verification request using the user data.

6. The method of claim 5, wherein user data comprises at least one of GPS data, biometric data, bibliographic data, and user contact data.

7. The method of claim 6, wherein user data is collected using at least one of a device camera, a speaker or a finger-print scanner, and wherein the biometric data comprises at least one of a fingerprint, a retina scan, voice recording and a facial recognition scan.

8. The method of claim 1, further comprising capturing the photograph using a camera on a user device.

9. The method of claim 1, further comprising allowing a user to select at least one user profile on a third-party platform; and uploading the encrypted profile picture to the selected at least one user profile.

10. A system for providing online identity verification of a user, the system comprising a server device and a network connection, the server device being configured to execute steps comprising:
    generating a unique identifier for the user;
    layering a stamp on a photograph of the user to create a new image file, wherein the stamp is a visual badge of authenticity;
    editing the new image file to embed steganographic code or a digital water mark to encode the new image file with an encrypted text string resulting in an encrypted profile picture, wherein the encrypted text string comprises the unique identifier;
    exporting the encrypted profile picture to the dynamic webpage, wherein an export timestamp is generated and incorporated in the encrypted text string during export, and
    creating an alert when the unique identifier or dynamic webpage URL is used in digital media,
    wherein the encrypted profile picture created is permanently displayed on the dynamic webpage, and
    wherein the stamp appearance varies with the amount of user data collected for verification.

11. The system of claim 10, further comprising encoding the stamp with the unique identifier and a dynamic webpage URL, such that the stamp is configured to display the unique identifier and a link to the dynamic webpage URL when selected or engaged through a GUI; and
    outputting the encrypted profile picture to the dynamic webpage.

12. The system of claim 11, wherein the dynamic webpage is accessible to a party seeking to verify an online identity of the user.

13. The system of claim 10, wherein the encrypted text string further comprises an export timestamp.

14. The system of claim 11, wherein the dynamic webpage is a user account profile page.

15. The system of claim 10, further comprising storing or communicating user data with a user database and sending a verification request using the user data.

16. The system of claim 15, wherein user data comprises at least one of GPS data, biometric data, bibliographic data, and user contact data, and wherein the user data is collected using at least one of a device camera, a speaker or a finger-print scanner, and wherein the biometric data comprises at least one of a fingerprint, a retina scan, voice recording and a facial recognition scan.

17. The system of claim 10, further comprising capturing the photograph using a camera on a user device.

18. The system of claim 10, further comprising allowing a user to select at least one user profile on a third-party platform; and uploading the encrypted profile picture to the selected at least one user profile.

* * * * *